Nov. 24, 1970  KEIZO IWASE ET AL  3,542,685
METHOD OF PRODUCING SPINEL TYPE FERRITES
Filed July 1, 1966  2 Sheets-Sheet 1

EQUILIBRIUM IN THE SYSTEM; $FeSO_4$-$H_2O$

INVENTORS
KEIZO IWASE
TOSHIO TAKADA
MASAO KIYAMA
BY Hopgood & Calimafde
ATTORNEYS EQUILIBRIUM IN THE SYSTEM; $MnSO_4-H_2O$ EQUILIBRIUM IN THE SYSTEM; $ZnSO_4-H_2O$ United States Patent Office 3,542,685
Patented Nov. 24, 1970

3,542,685
METHOD OF PRODUCING SPINEL TYPE FERRITES
Keizo Iwase, Toshio Takada, and Masao Kiyama, Kyoto, Japan, assignors to Nippon Electric Company Limited, Tokyo, Japan, a corporation of Japan
Filed July 1, 1966, Ser. No. 562,751
Int. Cl. C04b 35/26, 35/38
U.S. Cl. 252—62.62                          12 Claims

ABSTRACT OF THE DISCLOSURE

An organo salt of iron and other bivalent metal powders is produced characterized by the formation of the powder such as metallic oxalate containing ferrous ions and at least one kind of bivalent metal iron by pulverizing and mixing the solid mixture obtained by mixing with the crystal of a hydrated ferrous salt (causing incongruent melting) such as ferrous sulfate $FeSO_4 \cdot 7H_2O$ and ferrous nitrate $Fe(NO_3)_2 \cdot 2H_2O$, at least one kind of hydrated salt crystal of a bivalent metal (also causing incongruent melting) such as $CoSO_4 \cdot 7H_2O$, $MnSO_4 \cdot 7H_2O$, $ZnSO_4 \cdot 7H_2O$, $Co(NO_3)_2 \cdot 6H_2O$, $Mn(NO_3)_2 \cdot 6H_2O$, $Zn(NO_3)_2 \cdot 6H_2O$ or $Ni(NO_3)_2 \cdot 6H_2O$ and further mixing in the crystals of organic acids such as oxalic acid $H_2C_2O_4 \cdot 2H_2O$ or formic acid HCOOH or the crystals of hydrated organic alkali salts such as $(NH_4)_2C_2O_4 \cdot 2H_2O$, $Na_2C_2O_4 \cdot 2H_2O$ or $K_2C_2O_4, 2H_2O$ in solid state. These powders can be further decomposed to form ferrite powders of less than three microns.

This invention relates to the manufacturing of organo salts of iron and other bivalent metal powders, particularly such compounds containing different cations for employment as raw materials in spinel type ferrite powder.

Conventional production methods for spinel type ferrite particles embrace the dry, wet and oxalate methods. In the dry method, the ferrite particles are obtained by solid reaction of mixtures which contain ferric oxide ($\alpha$-$Fe_2O_3$) powder and one or more oxide or carbonate powders of Mn, Zn, Ni, Co, and etc.; this is the best known of the present methods. The ferrite particles thus obtained form agglomerated particles of about fifteen $\mu$ or over which are produced by sintering particles of about $0.3\mu$ or over each.

In the wet method, ferrite precipitates are obtained by adding an alkali to a mixed aqueous solution containing $Fe^{3+}$ and at least one of Ni, Zn, Mn and Co ions. The ferrite particles containing different cations and obtained by this method are below $0.05\mu$, and are difficult to both separate from solution and wash. The material obtained after filtering, washing and drying is very strongly agglomerated.

In the oxalate method, oxalate precipitates containing different cations are obtained by adding oxalic acid or alkali oxalate aqueous solutions to a mixed solution containing $Fe^{2+}$ and bivalent metallic ions aside from Fe. The size of the precipitated particles are $5\mu \sim 100\mu$ depending on the reaction condition. If these oxalate particles are calcined under predetermined conditions, spinel type ferrite particles retaining the apparent shapes of the oxalate particles are obtained.

It has become desirable in the production of ferrite cores to find an active ferrite powder suitable for decreasing the production cost by decreasing the sintering temperature as well as improving the magnetic properties by decreasing the grain size of the sintered particles via a decrease in the sintering temperature. According to investigations on dispersion power, compacted density and the molding and sintering properties of ferrite powders obtained by the above methods, industrially satisfactory ferrite cores were not obtainable with agglomerated particles having a diameter over $3\mu$ and produced from ferrite particles of over $0.2\mu$. Moreover, even with the crushing of these ferrites, using present crushing machines, the existence of agglomerated particles of over $.3\mu$ diameter can not be avoided, and consequently, the economical production of a superior ferrite core is difficult.

Accordingly, it is the object of this invention to provide a production method through which organo salts of ion and other bivalent metal powders with different cations of desired particle diameter and chemical composition may be cheaply obtained.

It is also the object of this invention to achieve the foregoing object by the mixing and a pulverizing reaction of solid raw materials.

It is still another object of this invention to provide a method for producing spinel type ferrite powder having desired shape and chemical composition; and it is a further object of this invention to accomplish this by employing the thermal decomposition of organo salts of iron and other bivalent metal compounds formed by the mixing and pulverizing reaction of solid raw materials.

And it is a still further object of this invention to offer organo salts of iron and other bivalent metals containing different cations and having new particle sizes and/or shapes suitable for the raw material of spinel type ferrite of superior magnetic properties.

Briefly, this invention is characterized by the formation of organo salts of iron and other bivalent metal powders such as metallic oxalate containing ferrous ions and at least one kind of bivalent metallic ions by pulverizing and mixing the solid mixture obtained as follows: mixing with the crystal of a hydrated ferrous salt (causing incongruent melting) such as ferrous sulfate $FeSO_4 \cdot 7H_2O$ and ferrous nitrate $Fe(NO_3)_2 \cdot 2H_2O$, at least one kind of hydrated salt crystal of a bivalent metal (causing also incongruent melting) such as $CoSO_4 \cdot 7H_2O$, $MnSO_4 \cdot 7H_2O$, $ZnSO_4 \cdot 7H_2O$, $Co(NO_3)_2 \cdot 6H_2O$, $Mn(NO_3)_2 \cdot 6H_2O$, $Zn(NO_3)_2 \cdot 6H_2O$ or $Ni(NO_3)_2 \cdot 6H_2O$ and further mixing in the crystals of organic acids such as oxalic acid $H_2C_2O_4 \cdot 2H_2O$ or formic acid HCOOH or the crystals of hydrated organic alkali salts such as $(NH_4)_2C_2O_4 \cdot 2H_2O$, $Na_2C_2O_4 \cdot 2H_2O$ or $K_2C_2O_4 \cdot 2H_2O$ in solid state.

According to the invention organo salts of iron and other bivalent metal particles containing different cations of below $3\mu$ in one dimension are formed, and further by thermally decomposing this compound a new spinel type ferrite particles having the same skeleton particle shape of below $3\mu$ as the original particles in the overall appearance are formed through sintering the minute separate particles.

The above mentioned and other features and objects of this invention and the manner of attaining them will become more apparent and the invention itself will best be understood by reference to the following description of embodiments of the invention taken in conjunction with the accompanying drawings wherein.

Figure 1A:
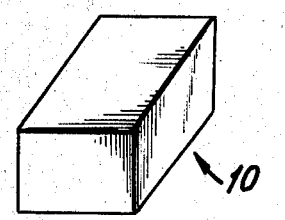
FIG. 1A shows a perspective view of an example of an organo salts of iron and other bivalent metal crystal.

A primary characteristic of the present invention is the forming of organo salts of iron and other bivalent metal powders, containing different cations, by the mixing and pulverizing reaction of solid raw materials. In the method of forming similar powders by the reaction of an aqueous solution containing metallic salts and oxalic acid or oxalates, it is difficult to make the obtained particle size of the organo salts of iron and other bivalent metal having different cations below $3\mu$, and also very difficult to obtain desired composition ratio of metallic ions contained therein. However, in the method of this invention, by choosing the amounts of organic acids in the raw materials (for example, oxalic acid crystals or oxalate crystals) such that oxalic acid ions will become larger than the equivalent amount of the total of metallic ions in the starting raw materials, the ratio between each metallic element is ferrous salts and in bivalent salts in the starting raw materials is almost unchanged in the formed organo salts of iron and other bivalent metals containing different cations.

As will be explained later, the organo salts of iron and other bivalent metals containing different cations are considered to be formed during mixing and pulverizing by the solution reaction taking place in the paste produced by the gradual dissolution of hydrated metallic salt crystals and for example, oxalic acid or oxalate crystals in water, formed by incongruent melting, as a result of the generated abrasive heat. Therefore, the concentrations of reacting ions are very large, but amounts of metallic ions present are small and almost the same ratio between metallic ions is maintained in the formed compounds.

Thus, it is possible to produce organo salts of iron and other bivalent metals containing different cations and having desired metallic ion ratio economically and efficiently by the method of this invention. The composition ratio of metallic ions contained in the product is mainly affected only by the ratio of metallic ions in the starting raw materials, and is not affected by temperature of reaction condition and mixing and pulverizing power. These facts will be made clear from the results shown in Table 1.

The crystal size of organo salts of iron and other bivalent metals containing different cations formed is affected particularly by the atmospheric temperature of the reaction. When the atmospheric temperature is high, the crystal grain size of the compounds formed becomes large. The ratio of the starting raw materials has almost no effect on grain diameters of the crystals formed. When the atmospheric temperature is about 60° C., the grain diameter is about $1.5\mu$. If a small amount of water is added to the starting raw materials, the reaction speed and the grain diameter are increased, and the composition of the crystal formed is slightly affected. If alkali is added instead of water, the reaction speed is increased but almost no effect is given to the crystal grain size formed and to the composition. When at least 10 weight percent of water is added to the total amount of the starting raw materials, the crystal grain size is observed to increase to about $3\mu$.

In a first embodiment, various amounts of bivalent metallic sulphates are prepared by weighing them against 1.390 kg. (5 mol) of $FeSO_4 \cdot 7H_2O$. Next oxalic acid crystals or oxalate crystals of more than equivalent amount of the total metallic or $SO_4^{2-}$ ions are prepared by weight. These crystals are charged into a ball mill having stainless balls. In some cases $H_2O$ or $NH_4OH$ aqueous solution may be added to the mill to increase the reaction speed. When the ball mill, containing the various amounts and kinds of raw materials, is rotated with the outside temperature maintained within 10° C. to 40° C., the initial raw materials will gradually form white or yellow-white metallic oxalate grains containing different cations as a result of the pulverizing and mixing reaction. The white or yellow-white slurry formed (depending on the reaction conditions) is separated from the ball mill, and washed with water at about 5° C. in order to remove the $SO_4^{2}$. The water is then itself removed as much as possible with an acetone bath. Metallic oxalate salt powders containing different cations are obtained after drying at 50° C. The ratio of metallic ion contents in the powders were determined by chemical analysis and the grain sizes measured by an electron microscope and the permeability method respectively. Table 1 shows the starting raw materials, pulverizing time, grain sizes of metallic oxalate salts powders containing different cations obtained, and the ratios of metallic ion contents. From Table 1, it may be seen that the grain size of the product becomes smaller as the added water decreases and for lower reaction temperatures. The ratio of metallic ion contents in the metallic oxalate powders containing different cations is different for the kind of oxalates used and for the amount of water used. That is, in order to obtain oxalate powder containing different cations having a composition ratio near to the composition ratio of the metallic ions in the starting raw materials, the amount of water added should be very small or the oxalate of very high basicity should be used. It is theorized that the formed metallic oxalates containing different cations have the chemical formula $Fe_{1-x}M_2C_xO_4 \cdot 2H_2O$, where M represents bivalent metallic elements other than Fe.

TABLE 1

| Starting raw material | | | Formation condition | | Organic salts of Fe and other bivalent metal M produced | | |
|---|---|---|---|---|---|---|---|
| $FeSO_4 \cdot 7H_2O$ | $ZnSO_4 \cdot 7H_2O$ | $H_2C_2O_4 \cdot 2H_2O$ | Addition agent | Outside temp., °C. | Pulverizing time, hrs.[1] | Grain diameter, $\mu$ | M/Fe |
| 5.00 mol | 0.50 mol | 5.70 mol | | 15 | 13 | 0.72 | Zn/Fe=0.11 |
| Do | 1.00 mol | 6.05 mol | | 15 | 13 | 0.70 | Zn/Fe=0.21 |
| Do | 0.50 mol | 5.60 mol | 0.21N $NH_4OH$, 0.15l | 15 | 10 | 0.68 | Zn/Fe=0.10 |
| Do | do | do | $H_2O$, 0.10l | 40 | 7 | 1.02 | Zn/Fe=0.12 |
| | $MnSO_4 \cdot 5H_2O$ | $(NH_4)_2C_2O_4 \cdot 2H_2O$ | | | | | |
| Do | 0.50 mol | 5.70 mol | | 10 | 13 | 0.78 | Mn/Fe=0.09 |
| Do | 1.00 mol | 6.10 mol | | 10 | 13 | 0.82 | Mn/Fe=0.19 |
| Do | 2.00 mol | 7.25 mol | 0.21 N $NH_4OH$, 0.15l | 10 | 9 | 0.72 | Mn/Fe=0.40 |
| Do | do | do | 0.21 N $NH_4OH$, 0.15l | 40 | 7 | 1.15 | Mn/Fe=0.40 |
| | $NiSO_4 \cdot 7H_2O$ | $H_2C_2O_4 \cdot 2H_2O$ | | | | | |
| Do | 0.50 mol | 5.60 mol | | 10 | 13 | 0.75 | Ni/Fe=0.10 |
| Do | 1.00 mol | 6.10 mol | | 15 | 13 | 0.73 | Ni/Fe=0.20 |
| Do | 2.00 mol | 7.10 mol | | 15 | 13 | 0.75 | Ni/Fe=0.40 |
| | $CoSO_4 \cdot 7H_2O$ | $H_2C_2O_4 \cdot 2H_2O$ | | | | | |
| Do | 0.50 mol | 5.60 mol | | 10 | 13 | 0.77 | Co/Fe=0.10 |
| Do | do | 6.20 mol | | 30 | 10 | 0.95 | Co/Fe=0.10 |
| Do | 1.00 mol | 7.20 mol | | 10 | 13 | 0.79 | Co/Fe=0.21 |
| Do | 1.50 mol | 8.20 mol | | 30 | 10 | 0.92 | Co/Fe=0.31 |
| | $MnSO_4 \cdot 5H_2O$ | $Na_2C_2O_4 \cdot 2H_2O$ | | | | | |
| Do | 2.50 mol | 7.80 mol | $H_2O$, 0.15l | 40 | 7 | 1.25 | $M^{2+}/Fe=0.50$ |

TABLE 1—Continued

| Starting raw material | | | Formation condition | | Organic salts of Fe and other bivalent metal M produced | | |
| --- | --- | --- | --- | --- | --- | --- | --- |
| FeSO₄·7H₂O | ZnSO₄·7H₂O | H₂C₂O₄·2H₂O | Addition agent | Outside temp., °C. | Pulverizing time, hrs.[1] | Grain diameter, μ | M/Fe |
| | NiSO₄·7H₂O | Na₂C₂O₄·2H₂O | | | | | |
| Do | 2.50 mol | 7.80 mol | H₂O, 0.151 | 40 | 7 | 1.13 | M²⁺Fe=0.50 |
| | CoSO₄·7H₂O | Na₂C₂O₄·2H₂O | | | | | |
| Do | 2.50 mol | 7.80 mol | H₂O, 0.151 | 40 | 7 | 1.46 | M²⁺Fe=0.50 |
| | CuSO₄·5H₂O | Na₂C₂O₄·2H₂O | | | | | |
| Do | 2.50 mol | 7.80 mol | H₂O, 0.151 | 40 | 7 | 1.32 | M²⁺Fe=0.50 |

[1] In the ball mill.

Figure 1B:
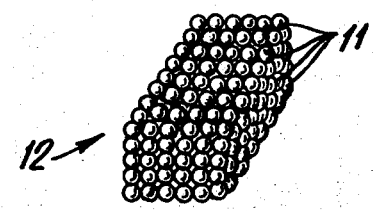
FIG. 1B illustrates in perspective the skeleton particle obtained by the thermal decomposition of the crystal of FIG. 1A.

The crystals of organo salts of iron and other bivalent metals, containing different cations and formed by the above method, for example, the crystals 10 of metallic oxalate have practically an isotropic shape as shown in FIG. 1A. When the crystal is thermally decomposed, the skeleton particle 12 shown in FIG. 1B and having the same outside shape as the original organo salts of iron and other bivalent metal crystal containing different cations 10 is formed through the sintering of each of the many small metallic oxide particles or alloys 11 (hereafter called unit particle). The ratio of metallic ion contents in the skeleton particle 12 is the same as that in the original crystal 10. In the thermal decomposition of the original crystal 10, the composition and the crystal structure of unit particle 11 are determined by the composition of the original crystal 10, heating temperature, and atmospheric conditions. The grain growth, that is, the grain size of the unit particle 10 varies with the heating temperature and heating period.

Let us now examine the case of thermal decomposition taken place in an oxidizing atmosphere containing over 3% oxygen by weight. When the ratio between the Fe ion contained in the original crystal 10 and the total of one or more kinds of bivalent metallic ions M is 2:1, the original crystal 10 becomes the skeleton grain 12 composed of unit particles 11 of spinel type ferrite M Fe₂O₄ by decomposition at above 200° C. in the air. In an atmosphere of 100% oxygen, the minimum temperature of thermal decomposition is lowered by about 5° C., and the decomposition speed is increased. In an atmosphere in which the oxygen partial pressure is smaller than that of air, the minimum decomposition temperature is increased, and the decomposition speed is decreased. In the atmosphere containing 3% oxygen, the decomposition takes place at about 400° C. The grain growth of the unit particle 11 is faster the higher the heating temperature, the longer the heating period, and the lower the oxygen partial pressure. Therefore, the grain diameter is increased. When the unit particle is obtained by thermal decomposition for two hours in air at 200° C., the size of the unit particle is about 220 A., and by increasing the temperature and heating period, the size is enlarged to 1,000 A. (If the oxygen partial pressure in the atmosphere is changed, the decomposition temperature and the heating period are changed.)

When the Fe ion in the original crystal is over twice the total of bivalent metallic ions, and when the original crystal 10 is heated from 200° C. to about 550° C. in air, a skeleton particle 12 composed of a unit particle 11 of spinel type ferrite containing extra iron (solid solution of M Fe₂O₄ and α-Fe₂O₃) and is formed. When it is heated in air at a temperature of just over about 550° C., the unit particle 11 decomposes into the spinel type ferrite M Fe₂O₄ and ferric oxide α-Fe₂O₃. The temperature limit again depends on the oxygen partial pressure in air as in the previous case. In this case, too, the unit particle of about 200 A. size is formed by two hours' heating at 200° C. in air. But the grain growth of the ferrite particle containing extra iron is small, and at about 550° C., grain growth of α-Fe₂O₃ takes place for an increased heating period. If the temperature is increased, the grain growth of ferrite M Fe₂O₄ takes place.

Further, if manganese is the bivalent metal in the original crystal, the spinel type ferrite is decomposed to Mn₂O₃ and α-Fe₂O₃ by heating at about 450° C. in air (in the case of atmosphere containing 3% O₂, the temperature is about 500° C.) in any of the above cases.

When the thermal decomposition reaction takes place in a neutral atmosphere (N₂, Ar or vacuum), the original crystal, that is, $M_{1-x}Fe_{2+x}$ oxalate (M represents one or more kinds of bivalent metal elements) yields the unit particle of ferrite M Fe₂O₄ for $x=0$ by the thermal decomposition at 400° C. to 500° C., and yields the solid solution (ferrite containing extra iron) between Fe₃O₄ and M Fe₂O₄ for $0<x<1$. However, when M includes manganese, a particle of FeO type crystal structure is formed. In the case of thermal decomposition of the original crystal at above 600° C., alloy particles and particles of FeO type crystal structure coexist aside from the ferrite.

In the case of thermal decomposition of the original crystal $M_{1-x}Fe_{2+x}$ oxalate in a reducing atmosphere (H₂ and others), the unit particle is composed of alloy and a certain amount of ferrite particles for temperatures between 400° C. and 500° C., and at temperatures above 500° C. the unit particle becomes the alloy particle. The unit particle grain size obtained by heating for two hours at 400° C. in a reducing atmosphere is over 600 A.

In any of the above cases, the size of the skeleton particle 12 formed is about 20% smaller than the size of the original crystal 10, and as the grain growth of the unit particle proceeds, a contraction of from 1 to 2% takes place.

As a second embodiment, 1500 g. of FeSO₄·7H₂O, 300 g. of CoSO₄·7H₂O and 900 g. of H₂C₂O₄·2H₂O are weighed and charged into a ball mill having stainless balls. When the ball mill is rotated for 13 hours with the outside temperature at 15° C., the materials inside the mill become a yellowish-white slurry. This slurry is filtered and washed with water at about 5° C., and after the $SO_4^{2-}$ is washed away, the water is then removed by acetone as before. After drying at 50° C., about 1 kg. of white-yellow powder having a yellowish tint was obtained. This powder is composed of oxalate particles containing different cations showing practically an isotrope shape and of average diameter of 0.82μ, and a ratio Fe:Co of 82.8:17.2 atom percent. When this powder is thermally decomposed, the composition, sizes and magnetic properties obtained with the delineated decomposition conditions are shown in Table 2. From this table, it can be seen that these products are effective as raw materials for magnetic recording materials. The metallic content ratio in the formed products is also Fe:Co= 82.8:17.2.

ment, it is necessary to have very pure fine MnZn powder as the raw material. While the required purity can be satisfied by MnZn Ferrite powder produced by the usual

TABLE 2

| Thermal decomposition condition | | Magnetic properties of the products | | | Product characters |
|---|---|---|---|---|---|
| Temp., °C | Atmosphere | Time, hrs. | Hc(ö) | Br | Size, $\mu$ | Composition |
| 400 | Air | 2 | 1,570 | 500 | 0.69 | Ferrite (solid solution of $\gamma$-$Fe_2O_3$ and $CoFe_2O_4$). |
| 500 | $N_2$ | 2 | 300 | 350 | 0.68 | Ferrite (solid solution of $Fe_3O_4$ and $CoFe_2O_4$) |
| 700 | $N_2$ | 2 | 75 | 250 | 0.56 | $Fe_3O_4$ and $CoFe_2O_4$. |
| 500 | $H_2$ | 2 | 675 | 602 | 0.68 | Alloy of Co and Fe. |

In a third embodiment, 1 kg. of white powder was obtained in a similar manner to that of embodiment 2 by using 1.39 kg. of $FeSO_4 \cdot 7H_2O$, 144 g. of $ZnSO_4 \cdot 7H_2O$ and 950 g. of $(NH_4)_2C_2O_4 \cdot 2H_2O$. This powder is composed of oxalate particles of average particle diameter of $0.82\mu$, and the metallic ion content ratio is Fe:Zn= 90:10 atom percent. When this powder is heated at 550° C. in air for two hours, orange colored powder was obtained. This powder was composed of uniformly mixed particles of $\alpha$-$Fe_2O_3$ and $ZnFe_2O_4$ having about $0.05\mu$ size in skeleton particles of $0.7\mu$. As and Pb contents, detrimental to the human body, were below 0.0001%, and dispersion powder for oil was good. This product was found as an excellent raw material for toilet articles.

In a fourth embodiment, 0.9 kg. of white powder was obtained again in a similar manner as in embodiment 2 using 1.39 kg. of $FeSO_4 \cdot 7H_2O$, 350 g. of $NiSO_4 \cdot 7H_2O$, 119 g. of $ZnSO_4 \cdot 7_2O$ and 950 g. of $(NH_4)_2C_2O_4 2H_2O$. This powder was composed of oxalate particles of average diameter of $0.75\mu$, and the metallic ion contents ratio were Fe:Ni:Zn=75:18.8:6.2 atom percent. When this powder is heated at 400° C. in air for two hours, the powder was composed of skeleton particles of average particle diameter $0.62\mu$ having Ni-Zn ferrite unit particles of 58A. A Ni-Zn ferrite sintered body obtained by press molding the Ni-Zn ferrite powder at $2.5/cm.^2$ by press molding it for two hours at 1200° C. in air gave permeability of 30–40 at several megacycle frequencies and showed superior high frequency magnetic characteristics.

Next we shall examine in detail a method for the production of a raw material powder for a Mn-Zn ferrite, which is excellent for telecommunication equipment.

It has been known to prepare oxalate crystals containing Fe, Mn and Zn from an aqueous solution containing each metal ion and oxalic acid, and then to decompose these crystals to yield MnZn Ferrite powder. This method finds particular application when chemically pure MnZn ferrite raw material is needed. Recently, an extremely high efficiency MnZn ferrite for telecommunication equipment has been required, and to meet this requireoxalate method, since its grain size is over $3\mu$, the fineness requirement is not met.

As was explained with reference to FIG. 1, the grain shape of metallic oxide obtained from thermal decomposition of metallic oxalates is a skeleton particle having almost the same shape as the original crystal and is brought about by sintering of fine unit particles. The above result was also obtained in the MnZn ferrite grain shape obtained by the thermal decomposition of oxalate crystals containing Fe, Mn, and Zn.

Various powders were prepared of different grain sizes for the skeleton particles and unit particles of MnZn ferrite having these grain shapes, and the properties of MnZn ferrite manufactured from these raw materials were investigated. The oxalates of various crystal sizes were prepared by changing the chemical reaction conditions during preparations, and from these various grain sizes of skeleton particles for ferrite powder were prepared by thermal decomposition. Both the unit particle size and skeleton particle size have an affect on properties of MnZn ferrite obtained after sintering. After various investigations, it was found that in order to improve the pressure molding property of the powder and magnetic characteristic of the sintered body, the unit particle size should be below 1000 A. and the skeleton particle size should be below $3\mu$; below $1\mu$ was found particularly desirable. A part of the results is depicted in Table 3.

This table shows the resultant molding characteristic and magnetic properties for an MnZn ferrite powder obtained by thermal decomposition at 400° C. for 3 hours of the oxalate prepared by this method and having the same metal content ratio as the oxalate prepared by the usual method and containing the ratio Mn:Zn:Fe =19.5:11.1:69.4 atom percent.

TABLE 3

[Characteristics of MnZn ferrite prepared from oxalate containing Fe-Mn-Zn]

| Manufacturing method | Grain diameter of oxalate, $\mu$ | Molding property of the powder | Magnetic property ($\mu_0$ at 100 kc.) of the sintered body at each sintering temperature (4 hrs. in $N_2$) | | | |
|---|---|---|---|---|---|---|
| | | | 1,150° C. | 1,200° C. | 1,220° C. | 1,240° C. |
| Usual method | 10 | No good | | 980 | 1,220 | 1,490 |
| Do | 4 | Good | 780 | 1,115 | 1,390 | 1,695 |
| Inventors method | 0.7 | Excellent | 1,550 | 1,630 | 1,760 | 2,120 |

According to the usual oxalate method, oxalate crystal containing Mn, Zn and Fe was obtained by the precipitation reaction of the addition of oxalate aqueous solution to, for example, aqueous solutions of sulphate of Fe, Mn and Zn. While the inventors tried to obtain a precipitate of as fine and uniform a grain size as possible, it was determined that the particle size of the precipitate becomes smaller:

(a) The higher the concentrations of metallic ions and oxalic acid ions in the solution are, (b) The lower the temperature of the reacting aqueous solution is, and (c) The shorter the aging period is.

No matter how the experimental conditions of (a) to (c) were changed, it was not possible to obtain uniform oxalate precipitate particles containing Mn, Zn and Fe and having particle size of below 1μ by the usual method.

According to this invention, crystals of metallic salts having crystalline water containing Fe, Mn and Zn (which cause incongruent melting by heating) for example, $FeSO_4 \cdot 7H_2O$, $MnSO_4 \cdot 5H_2O$, $ZnSO_4 \cdot 7H_2O$, $$Fe(NO_3)_2 \cdot 6H_2O$$

$Mn(NO_3)_2 6H_2O$ or $Zn(NO_3)_2 6H_2O$ and organic hydrated salt such as oxalate crystals of for example, $(NH_4)_2C_2O_4 \cdot 2H_2O$, $Na_2C_2O_4 \cdot 2H_2O$ or $K_2C_2O_4 \cdot 2H_2O$ are charged into a ball mill and are mixed and pulverized. Various fine powders of organo salts of iron and other bivalent metals containing different cations, like oxalate compounds containing Fe, Mn and Zn, and having uniform particle size of below 3μ diameter are thus produced. By thermally decomposing these organo salts of iron and other bivalent metals, containing different cations, fine powders of MnZn ferrite are produced.

Next we shall investigate the details of the formation of the fine oxalate crystal powders containing Fe, Mn and Zn by the described mixing pulverization of solid crystals of, for example, $FeSO_4 \cdot 7H_2O$, $MnSO_4 \cdot 5H_2O$, $$ZnSO_4 \cdot 7H_2O$$

and $(NH_4)_2C_2O_4 \cdot 2H_2O$.

Figure 2A:
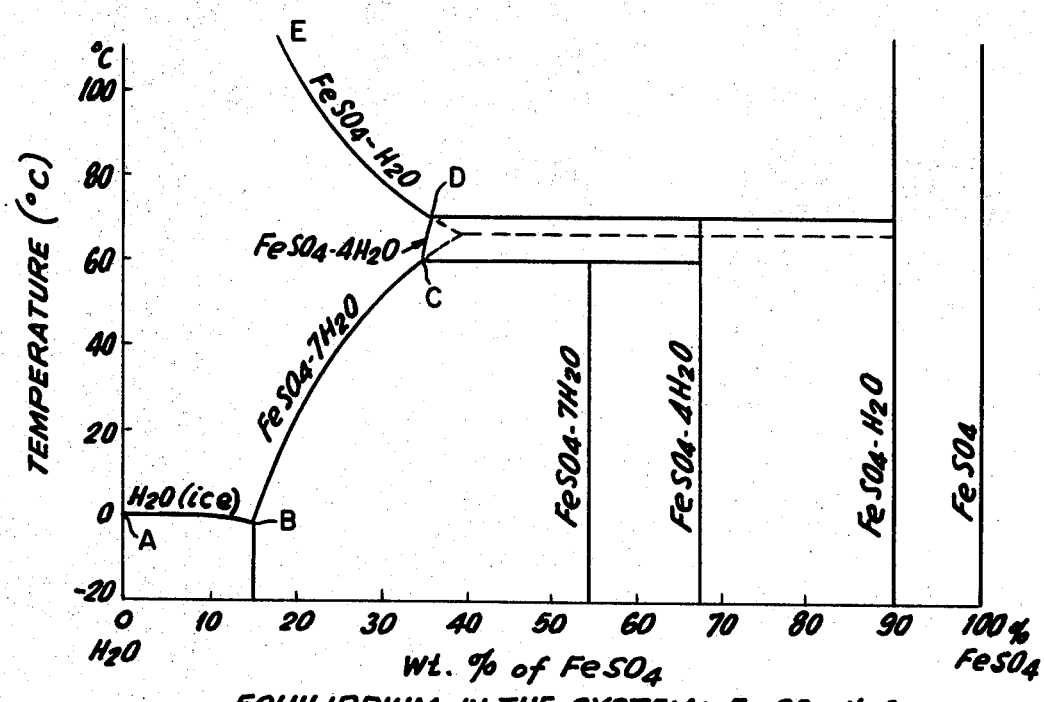
FIG. 2A is an equilibrium graph of an $FeSO_4$-$H_2O$ system.

The chemical changes that take place in heating $FeSO_4 \cdot 7H_2O$ crystal are easily and clearly understood by reference to FIG. 2A. BC, CD and DE of FIG. 2A show the relation between solubility in water of $FeSO_4 \cdot 7H_2O$, $FeSO_4 \cdot 4HO$ and $FeSO_4 H_2O$ and temperature respectively. In FIG. 2A is looked upon as an equilibrium phase diagram of $FeSO_4$-$H_2O$ system, by heating $FeSO_4 \cdot 7H_2O$ to about 57° C., $FeSO_4 \cdot 7H_2O$ is decomposed into $FeSO_4$ aqueous solution having concentration of point C and $FeSO_4 \cdot 4H_2O$ through so-called incongruent melting; that is, $$FeSO_4 \cdot 7H_2O \rightleftharpoons FeSO_4 \cdot 4H_2O + FeSO_4$$

solution is obtained. If this is further heated to about 67.4° C., then as above, $$FeSO_4 \cdot 4H_2O \rightleftharpoons FeSO_4 \cdot H_2O + FeSO_4$$

solution is obtained, and $FeSO_4$ aqueous solution of concentration shown by D and $FeSO_4$ $H_2O$ crystals are obtained. If $FeSO_4$ $4H_2O$ is heated as the starting material, incongruent melting then takes place as above at about 67.4° C.

Incongruent melting similarly takes place by heating $MnSO_4 \cdot 7H_2O$ and $ZnSO_4 \cdot 7H_2O$.

Figure 2B:
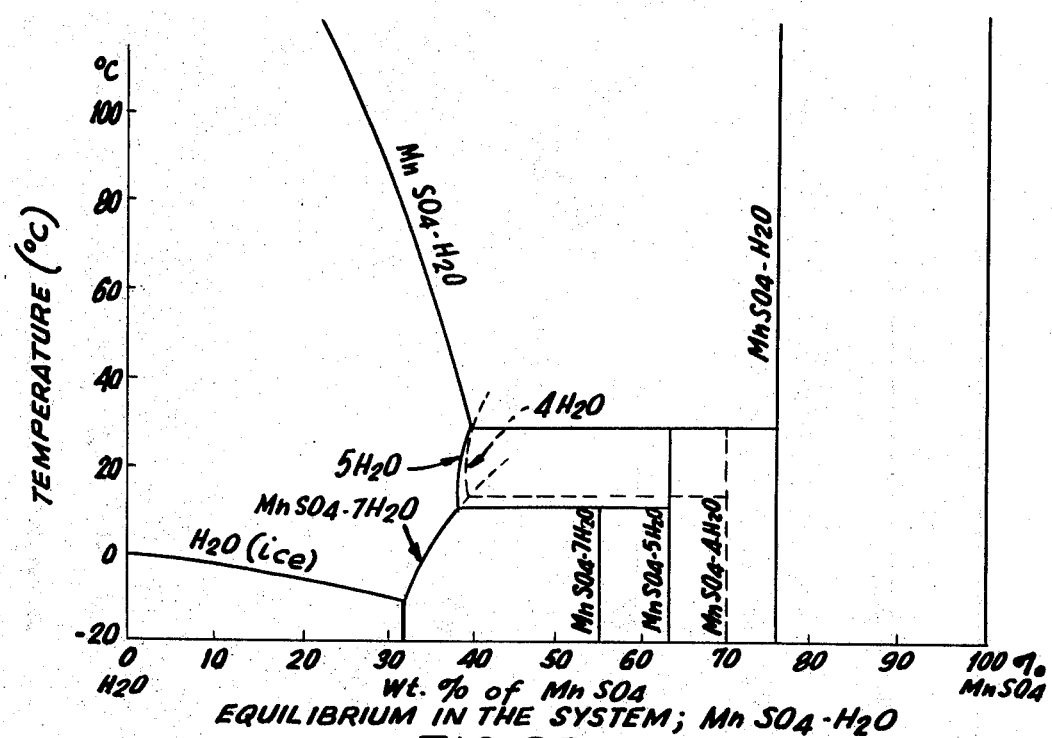
FIG. 2B is an equilibrium graph of an $MnSO_4$-$H_2O$ system.
Figure 2C:
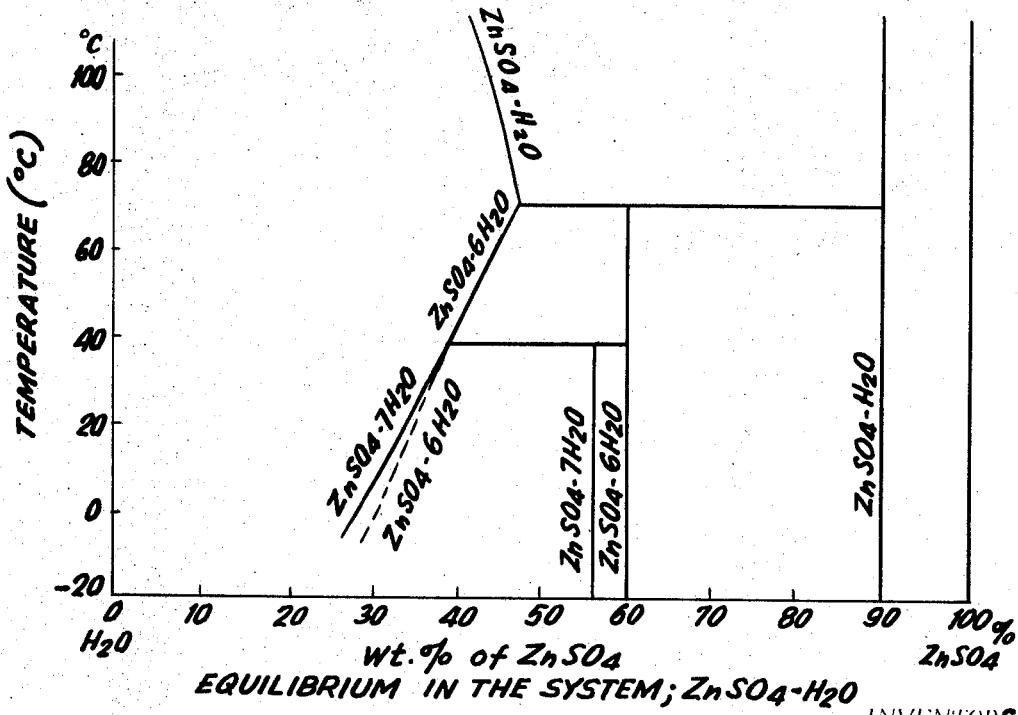
FIG. 2C is an equilibrium graph of an $ZnSO_4$-$H_2O$ system.

FIG. 2B and FIG. 2C show equilibrium phase diagrams of $MnSO_4$-$H_2O$ and $ZnSO_4$-$H_2O$ systems, respectively, representing changes of solubilities with temperature. For these figures, we can easily understand the occurrence of incongruent melting.

In this way, $FeSO_4 \cdot 7H_2O$, $ZnSO_4 \cdot 7H_2O$ and $$MnSO_4 \cdot 5H_2O$$

forms aqueous solutions. Therefore, if these crystals are heated by abrasion in a mortar grinding and in a ball mill, a part of the crystals form aqueous solution by incongruent melting, and the whole powders become wet. The degree of wetting depends on conditions of pulverizing operation. If oxalates are mixed in the starting material, they are dissolved in aqueous solutions formed by pulverization, and form oxalate crystals of $$Fe_{1-(\alpha+\beta)}Mn_\alpha Zn_\beta C_2O_4 \cdot 2H_2O$$

containing Mn, Zn and Fe by precipitation reaction.

The mechanism of oxalate precipitation formation in our method is considered to be due to the above reaction. The oxalate crystal grain size obtained by this method is below 3μ and is comparatively uniform. This fact is considered to be due to high concentration of Fe, Mn and Zn in the aqueous solutions formed by incongruent melting and therefore the precipitation nuclei are much greater than with the usual method. Thus, the particle size of the precipitate of below 1μ which has never been obtained by the usual method is considered to be formed easily.

When oxalates containing Fe, Mn and Zn are produced by this method, one more advantage is obtained. When it is desired to precipitate oxalate containing the required ratio of Fe, Mn and Zn respectively, the composition ratios in oxalates formed will be different from the composition ratios of Fe, Mn and Zn in aqueous solutions according to the usual method. This is considered to be due to difference of solubilities of Fe, Mn and Zn in mother solutions. However, in preparing precipitate by the present method, since the amount of mother solution formed is very small, the composition ratios of Fe, Mn and Zn in the solid salts become equal to the composition ratios in the oxalates precipitated, if oxalic acid crystal or oxalate containing oxalic acid ions over equivalent amount of total of Fe, Mn and Zn ions is added. This point is a great advantage over the usual method in the production of MnZn ferrite material.

The method of this invention is to produce oxalate crystals by mixing pulverization with the ball mill using only solid crystals of Fe, Mn and Zn as starting material as above described. Of course, even if a small amount of water is added to the starting material, this reaction takes place. However, as was described in the above example, if the amount of addition water is increased, the crystal size of oxalate formed becomes little larger. If a small amount of ammonia water is added, the composition ratios of Fe, Mn and Zn in the starting solid salt mixture are obtained exactly in the precipitated oxalate. The other effects on composition of precipitated metallic oxalate and grain diameter are the same as those explained in the previous examples.

In a fifth embodiment, 0.237 kg. of $ZnSO_4 7H_2O$, 0.383 kg. of $MnSO_4 \cdot 5H_2O$, 1.438 kg. of $FeSO_4 \cdot 7H_2O$ and 1.090 kg. of $(NH_4)_2C_2O_4 \cdot 2H_2O$ were charged into the stainless ball mill. The ratios of metallic ions $$Fe:Mn:Zn = 67.0:20.4:12.6$$

atom percent, and when converted to oxides, were $$Fe_2O_3:MnO:ZnO = 53:30:17$$

mol percent. When the materials are pulverized in the mill for 13 hours maintaining the outside temperature at 10° C., a yellowish-white slurry is obtained. This slurry is filtered and the $SO_4^{2-}$ is washed with water; and then the water removed with acetone. After drying at 50° C., 1.1 kg. of yellowish-white powder was obtained. According to the results of X-ray analysis, chemical analysis and grain size measurement, this powder had average grain diameter of 0.7μ and practically isotropic shape; the powder is composed of oxalate particles having Mn, Zn and Fe as solid solution. The ratio of metallic ion contents were as follows: Fe:Mn:Zn=66.9:20.1:13.0 atom percent.

In a sixth embodiment, 0.237 kg. of $ZnSO_4 \cdot 7H_2O$, 0.383 kg. of $MnSO_4 \cdot 5H_2O$, 1.438 kg. of $FeSO_4 \cdot 7H_2O$ and 1.090 kg. of $(NH_4)_2C_2O_4 \cdot 2H_2O$ are weighed and charged into the stainless ball mill. Next 0.105 l. of water is charged. The mill is rotated for 9 hours keeping the mill outside temperature constant at 10° C., 1.1 kg. of yellowish-white slurry is obtained. This powder is oxalate crystal particles containing different cations having substantially isotropic shape, and the ratios of metallic ions contained are as follows: Fe:Mn:Zn=67.0:19.8:13.2 atom percent.

In a seventh embodiment, 0.237 kg. of $ZnSO_4 \cdot 7H_2O$, 0.383 kg. of $MnSO_4 \cdot 5H_2O$, 1.438 kg. of $FeSO_4 \cdot 7H_2O$ and 1.090 kg. of $(NH_4)_2C_2O_4 \cdot 2H_2O$ are charged into the ball mill. Next 0.09 l. of 0.2 $N$-$NH_4OH$ is added. By rotating the bill for 7 hours and keeping the outside temperature at 40° C., yellowish-white slurry is obtained from the starting raw materials. 1.1 kg. of yellowish-white is obtained by the process described. This powder showed substantially isotropic shape having average grain diameter of 0.95$\mu$; the powder consisted of oxalate crystal particles containing different cations, and the metallic ion ratios were as follows: Fe:Mn:Zn=67.1:20.2:12.7 atom percent.

In an eighth embodiment, 57.6 g. of $ZnSO_4 \cdot 7H_2O$, 482 g. of $MnSO_4 \cdot 5H_2O$, 1390 g. of $FeSO_4 \cdot 7H_2O$ and 1.130 kg. of $(NH_4)_2C_2O_4 \cdot 2H_2O$ were charged into the ball mill as in the first embodiment. The metallic ion ratios are as follows: Fe:Mn:Zn=71.8:25.6:2.6 atom percent, and this corresponds to $Fe_2O_3$:MnO:ZnO=56:40:4 mol percent. Next 0.11 l. of 0.2N-$NH_4OH$ is added, and the mill is rotated for 9 hours maintaining the outside temperature at 22° C. Yellowish-white slurry is obtained from the starting raw materials. After the slurry is separated from the balls and filtered; the $SO_4^{2-}$ is washed by 0.05 N-$NH_4OH$ aqueous solution at about 50° C.; and the water containing $NH_3$ is sufficiently removed by acetone 1.11 kg. of white powder was obtained. This powder showed substantially isotropic shape having average diameter of 0.80$\mu$, and is composed of oxalate crystal particles containing different cations. The metallic ion ratios are Fe:Mn:Zn=71.8:25.6:26
atom percent.

As in the foregoing embodiments, fine oxalate powders containing Fe, Mn and Zn are obtained; the hydrated metallic oxalates containing Fe, Mn and Zn in the range of composition ratios:

$Fe_2O_3$:MnO:ZnO=57.0–52.0:43.5–28:5:17.6–0 mol percent.

Fine oxalate powders containing Fe, Mn and Zn of almost the same ion content ratios can be obtained through a method similar to those described in the above examples from oxalate crystals containing an oxalic ion content above the equivalent of total metallic ions, or from oxalates as starting materials. The oxalate powder thus obtained consistently showed isotropic shape with a grain size in the range of 3$\mu$~1.5$\mu$, and is found very suitable as raw material for high efficiency MnZn ferrite.

We shall now direct our attention to the details of the obtaining of the spinel type ferrite fine powder by thermal decomposition of the above described oxalate fine powder containing Fe, Mn and Zn, and also to the struction of the powder.

The above described oxalate powder, containing Fe, Mn and Zn, is decomposed 200° C. in air, however, if decomposition takes place in oxidizing atmosphere other than air, the decomposition temperature must be increased for lower oxygen partial pressures, as was previously described. When the powder is calcined in a furnace heated to 250° C.–450° C. in air, the powder formed becomes the spinel type ferrite. This powder consists of skeleton particles which keep almost the same shape as the crystal appearance of the starting oxalate. In the skeleton particle many unit particles are sintered to each other. The size of the unit particle is about 220 A.–600 A., and the size becomes larger for higher heating temperatures and for longer heating times. When the powder is heated in air at 450° C., (above 500° C. in the atmosphere containing 3% $O_2$) $\alpha$-$Fe_2O_3$ also precipitates (besides the spinel type ferrite). This powder (containing $Fe_2O_3$) was found to be unsuitable for raw material of superior MnZn ferrite.

Where the atmosphere contains $O_2$ as well as air, the growth of unit particle is little greater than that in air. When the powder is heated in atmosphere containing below 3% $O_2$ in volume, complex oxides containing Fe, Mn and Zn showing FeO structure or alloys containing Fe, Mn and Zn are sometimes also formed. MnZn ferrite of superior properties cannot be obtained from such powder material.

In a ninth embodiment, the oxalate powder, obtained via embodiments 5–8, is placed separately into a stainless boat (width 20 cm., depth 2 cm., length 45 cm.) each to a thickness of 1.5 cm., and the powder is heated in an electric furnace at the temperature of 250°–480° C. for two hours while air is passed through at the speed of 5 cm. per second. The crystal structure of the brown ferromagnetic powder was studied by means of X-ray analysis, and the particle diameter of the unit particle was measured. The results are shown in Table 4. The compositions of spinel type ferrites formed are $Zn_{0.390}Mn_{0.603}Fe_{2.007}O_{4.003}$ for the material obtained in the Example 5, $Zn_{0.396}Mn_{0.594}Fe_{2.010}O_{4.005}$ $Zn_{0.381}Mn_{0.606}Fe_{2.013}O_{4.006}$ and $Zn_{0.780}Mn_{0.768}Fe_{2.145}O_{4.007}$ for those of the Examples 6, 7 and 8 respectively.

TABLE 4

| Heating temperature, °C | 250 | 300 | 360 | 400 | 480 |
| --- | --- | --- | --- | --- | --- |
| Crystal structure of the product | Spinel | Spinel | Spinel | Spinel | Spinel |
| Particle diameter of the unit particle, A | 240 | 260 | 300 | 600 | [2] 180 |

[1] Plus 25-$Fe_2O_3$.
[2] Size of the spinel.

According to electron microscope observation, the shape of the skeleton particle is similar to the appearance of the starting oxalate and the size shrinks about 20%. According to the investigation by the electron microscope and BET method on diameter of the unit particle, the results coincided well with the above table. According to chemical analysis no $Fe^{+2}$ ion is contained in the product and only $Fe^{+3}$ ions exist.

In a tenth embodiment, Mn–Zn–Fe oxalate powder containing different cations obtained by the same method as the Example 5 is placed in a stainless boat (width 20 cm., depth 2 cm., length 45 cm.) to 0.5 cm. thickness. The powder is heated at 380° C. for two hours while $N_2$ is passed through at the speed of 5 cm. per second. After two hours, $N_2$ gas is stopped and is replaced with $H_2O$ gas during heating at 380° C. According to X-ray analysis, the black ferromagnetic powder is composed of spinel type oxide only. The diameter of the unit particle was 800 A. The size of the skeleton particle was on the average 0.55$\mu$, and the shape was similar to the mother crystal appearance. According to chemical analysis $Fe^{2+}$ was observed. From these results this powder is considered to be solid solution of $Fe_3O_4$ and spinel type MnZn ferrite.

As are shown in the foregoing spinel type MnZn ferrite powder is obtained when the oxalate fine powder obtained by this method and containing Fe, Mn and Zn is decomposed in air at the temperature below about 450° C. The shape of the skeleton particle showed practically isotropic property maintaining the exterior appearance of the mother crystal. The size was below 3$\mu$ with little shrinkage compared to the mother salt. In the skeleton particle many unit particles of 220 A.–1000 A. are sintered. MnZn ferrtie powder having composition range $$Fe_2O_3:MnO:ZnO = 57.0-52:43.5-28.5:17.6-0$$

is obtained by an operation similar to the above examples and the shape of the powder was similar.

We shall now turn our attention to applications of the powder obtained by the above method. In the production of MnZn ferrite for high efficiency telecommunication equipment; impurities such as Si, alkali metal and alkali earth metal contained in the raw material should be below 1.018 wt. percent respectively. When the raw material is produced by embodiments 9 and 10, the following conditions should be observed to obtain the necessary high purity:

(A) Impurities in the salts of Fe, Mn and Zn used as the raw material, in the addition water, $(NH_4)_2C_2O_4 \cdot 2H_2O$, aqueous ammonia and water used for washing the precipitate should not exceed the above limits.

(B) The material of mixing and pulverizing machine should be all stainless steel.

(C) The operation process should be carried out in a closed room. If inclusion of impurities is avoided by careful treatment. Si. alkai and alkali earth metal will be below purities in the spinel ferrite powder obtained by thermal decomposition of the oxalate will be below 0.036 wt. percent.

When MnZn ferrite, produced by the method of embodiments 9 and 10 having the composition ratios $Fe_2O_3$: $MnO:ZnO = 57.0-52.0:28.5-43.5:17.6-0.1$ mol percent and the diameter of the skeleton particle $1\mu$–$0.3\mu$ with the unit particle size below 1000 A., is molded and the press molded material is sintered in gas containing 0.2% $O_2$ for 4 hours at 1200° C. the MnZn ferrite sinter obtained consistently showed a $\mu_0$ of over 2000 at 100 kc., and tan $\delta/\mu_0 \times 10^6$ was below 2.0.

For raw material powder used as MnZn ferrite for the flyback transformer of television set, such a high purity is not required. In such cases, the MnZn ferrite produced by this method using the oxalate fine powder containing Fe, Mn and Zn as starting material can be used for the easy production of the sintered ferrite by press molding at 1.5 T./cm.² and by heating at 1250° C. for two hours in the air.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. The method of manufacturing spinel ferrite powders comprising the steps of: mixing and pulverizing hydrated salts of iron and at least one of other ferrite-forming bivalent metals and a solid body selected from the group consisting of organic acid crystals of oxalic and formic acid and hydrated alkali and ammonium salts thereof to produce an organic compound containing iron ions and said other ferrite-forming bivalent metal ions and thermally decomposing said organic compound in an oxidizing atmosphere at a temperature ranging from about 200° C. to about 500° C. whereby to produce ferrite powder composed of skeleton particles of size below 3 microns with unit particles thereof below about 1000 A. being sintered to each other.

2. The method claimed in claim 1 wherein said salts of iron and said at least one other ferrite-forming bivalent metal are such the incongruent melting occurs through heating caused by said pulverizing.

3. The method claimed in claim 1, wherein said hydrated alkali and ammonium salt crystals are selected from the group consisting of ammonium oxalate crystals, sodium oxalate crystals and potassium oxalate crystals.

4. The method claimed in claim 1, wherein less than 10% of water or ammonium water is added during the mixing and pulverizing step.

5. The method claimed in claim 1, wherein said other ferrite-forming bivalent metal is selected from the group consisting of manganese, zinc, nickel, cobalt and copper.

6. The method of manufacturing spinel ferrite powders comprising the steps of: mixing and pulverizing a ferrous salt and at least one other ferrite-forming bivalent metal salt, said salts being such that incongruent melting occurs through heating caused by said pulverizing, together with a solid body selected from the group of crystals of oxalic and formic acid and hydrated alkali and ammonium salt crystals thereof to produce an organo salt of iron and said other ferrite-forming bivalent metal and having the particle size below $3\mu$; and heating said organo salt in an oxidizing atmosphere at a temperature ranging from about 200° C. to about 500° C. to obtain a ferrite powder containing iron and said other bivalent metal and composed of skeleton particles of below $3\mu$ in size in which unit particles of below 1000 A. in size are sintered to each other.

7. The method claimed in claim 6, wherein said ferrous salt is selected from ferrous sulfate and ferrous nitrate, wherein said at least one other ferrite-forming bivalent metal salt is selected from manganese sulfate, zinc sulfate, cobaltous sulfate, nickel sulfate, manganese nitrate, zinc nitrate, cobaltous nitrate and nickel nitrate, and wherein said solid body is selected from oxalic acid crystal, formic acid crystal, hydrated ammonium oxalate crystal, hydrated sodium oxalate crystal and hydrated potassium oxalate crystal.

8. The method of manufacturing a ferrite powder comprising the steps of: mixing and pulverizing hydrated ferrous salt crystals and hydrated salt crystals of at least one other ferrite-forming metal selected from manganese, zinc, cobalt and nickel in a ratio that iron ions are at least twice as much as said other metal ions, said salt crystals being such that incongruent melting occurs through heating caused by said pulverizing, together with hydrated organic compound crystals selected from oxalic acid crystals, formic acid crystals and alkali and ammonium salt crystals of said organic acids to produce a powder of an organo salt of iron and said at least one other metal having the particle size of below $3\mu$; heating said organo salt powder at a temperature ranging from about 200° C. to about 500° C. in an oxdizing atmosphere to obtain a spinel-type ferrite powder composed of skeleton particles of below $3\mu$ in particle size in which unit particles of below 1000 A. are sintered with each other, said ferrite containing iron and said at least one other metal atoms in a ratio that iron atoms are at least twice as much as said other metal atoms.

9. The method claimed in claim 8, wherein said hydrated organic compound crystals are selected from oxalic acid crystals, alkali salt crystals of oxalic acid and ammonium oxalate and mixed in an amount such that the oxalate ions are at least equivalent to the total amount of iron and said other metal ions and wherein said organo salt powder produced contains iron and said other ferrite-forming metal in substantially the same ratio as in the initial salt crystals.

10. The method of manufacturing MnZn ferrite powders comprising the steps of: mixing and pulverizing hydrated ferrous salt crystals and hydrated salt crystals of manganese and zinc, said salts being such that incongruent melting occurs through heating caused by said pulverizing and which contain iron, manganese and zinc ions in a ratio by mol percent of 57.0 to 52.0: 43.5 to 28.5: 17.6 to 0 as represented by $Fe_2O_3:MnO:ZnO$, together with hydrated organic compound crystals selected from the group of oxalic acid crystals, ammonium oxalate crystals, sodium oxalate crystals, and potassium oxalate crystals which contain oxalate ions over the equivalent amount of the total of iron, manganese and zinc ions, to produce metallic oxalate fine powder containing iron, manganese and zinc in approximately the same ratio as in the initial salts crystals and having the particle size below $3\mu$; and heating said metallic oxalate powder at a temperature between 200° C. and 500° C. in an oxidizing atmosphere containing at least 3 weight percent oxygen to obtain MnZn ferrite powder composed of skeleton particles having the particle size below $3\mu$ in which spinel-type ferrite particles of below 1,000 A. diameter are sintered to each other.

11. The method claimed in claim 10, wherein said hydrated ferrous, manganese and zinc salts are ferrous sulfate, manganese sulfate, and zinc sulfate, respectively, and said hydrated organic compound is ammonium oxalate.

12. The method claimed in claim 10, wherein less than 10 wt. percent of water or ammonia water is added during the mixing and pulverizing step.

References Cited
UNITED STATES PATENTS

| | | | |
|---|---|---|---|
| 2,689,167 | 9/1954 | Davey et al. | 252—62.56 X |
| 3,189,550 | 6/1965 | Malinofsky | 252—62.62 X |
| 3,278,440 | 10/1966 | Schuele | 252—62.56 |
| 3,317,574 | 5/1967 | Morita et al. | 252—62.56 X |
| 3,428,416 | 2/1969 | Gie et al. | 252—62.62 X |

TOBIAS E. LEVOW, Primary Examiner

J. COOPER, Assistant Examiner

U.S. Cl. X.R.

252—62.56, 62.6; 23—51